Aug. 26, 1924.　　　　　　　　　　　　　　　　1,506,019
C. L. McCARTY
FILTER
Filed May 16, 1919　　　　2 Sheets-Sheet 1

Inventor:
Charles L. McCarty
by George A. Pennington
his Attorney

Aug. 26, 1924.  
C. L. McCARTY  
FILTER  
Filed May 16, 1919
1,506,019
2 Sheets-Sheet 2
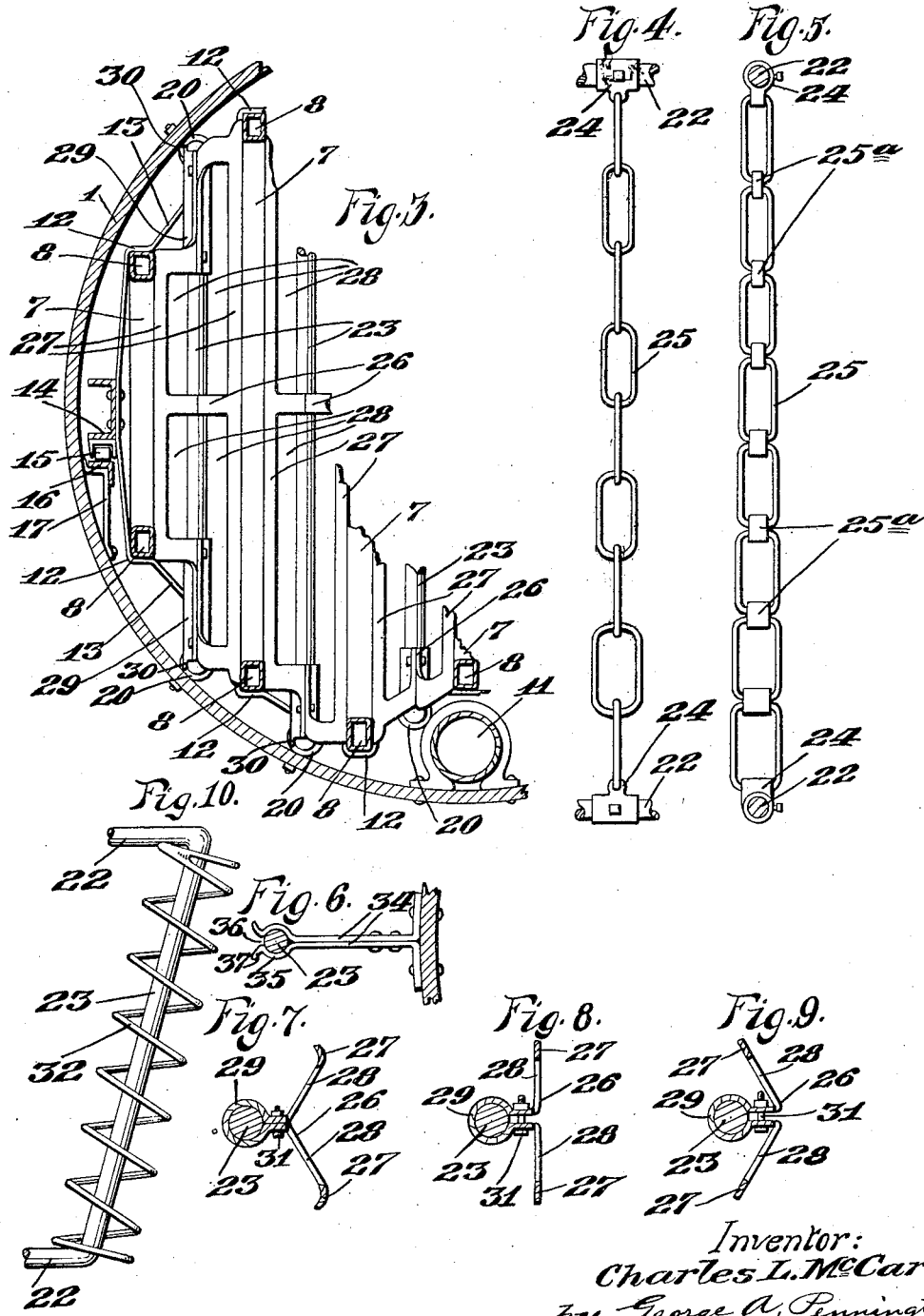
Inventor:  
Charles L. McCarty,  
by George A. Pennington  
his Attorney.

Patented Aug. 26, 1924.

1,506,019

UNITED STATES PATENT OFFICE.

CHARLES L. McCARTY, OF EAST ST. LOUIS, ILLINOIS, ASSIGNOR, BY DIRECT AND MESNE ASSIGNMENTS, OF ONE-SIXTH TO WILLIAM H. HORNER AND ONE-SIXTH TO ROBERT W. SIKKING, BOTH OF EAST ST. LOUIS, ILLINOIS.

FILTER.

Application filed May 16, 1919. Serial No. 297,455.

*To all whom it may concern:*

Be it known that I, CHARLES L. MCCARTY, a citizen of the United States, residing in the city of East St. Louis, in the county of St. Clair and State of Illinois, have invented a new and useful Improvement in Filters, of which the following is a specification.

This invention relates to filters and more particularly to such devices commonly known as filter presses for industrial purposes, in ore treatment and recovery, sugar making, and other cases where filtration is required.

In certain industries these devices are employed to filter liquid and semi-liquid ingredients, material or mixtures, either to eliminate unrequired or objectionable heavy constituents or particles therefrom or to separate the same for some particular use. In any case, the deposit or residue adhering to the surface of the filter leaves or plates has to be removed from time to time, either as waste or a valuable product for some use, as the case may be, and, in many instances, it is accomplished only by manual labor and at considerable time and expense, and also with the liability of injuring the filter cloth or material.

The present invention, therefore, has for its principal objects to minimize the time and expense incidental to the removal of the deposit from the filter and to avoid injuring the fabric or material of the filter leaves or plates; to produce a novel and efficient mechanical contrivance which may be applied to the filter apparatus or machine as an attachment or component part thereof to automatically remove the deposit and deliver the same in a uniform condition; and to attain certain advantages as will more fully appear in the following description.

In the accompanying drawings wherein a practical embodiment of the invention is illustrated,—

Figure 3 is a fragmentary cross-section through the barrel to show the relation of the deposit-removing appliance to the filter leaves;

Figure 4 is a detail view of a preferred form of chain to be used in connection with the appliance;

Figure 5 is a detail view of a modification of the chain;

Figure 6 is a fragmentary detail vew illustrating a spring-catch for the slidable yoke;

Figure 7, 8 and 9 are detail cross-sections through different forms of the scraper; and Figure 10 is a detail view of a substitute for the scraper.

Figure 1:
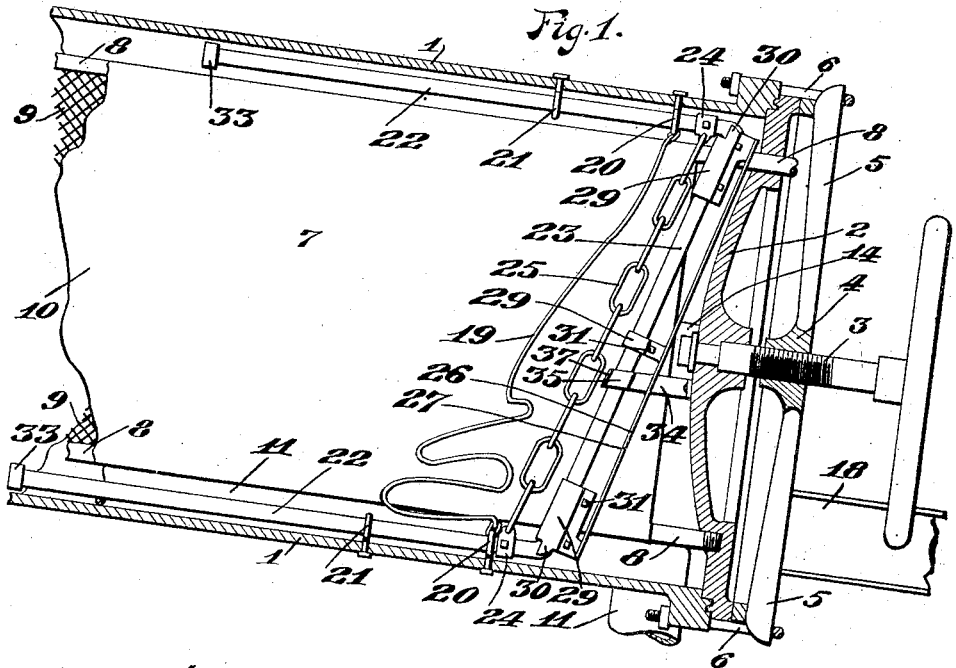
Figure 1 is a fragmentary section of the head end portion of a filtering apparatus known in the art as a Kelly pressure filter, and showing the present deposit-removing appliance in normal position therein.

Referring now to the drawings, the numeral 1 designates the barrel of the filter apparatus or press which is normally closed at both ends. At one end the head 2 is removable, but normally clamped in place by a swivelled screw 3 which works through a spider frame 4 whose legs 5 are attached to the end of the barrel 1 by removable U-bolts 6.

Within the barrel 1 are vertically disposed filter elements or leaves 7 which are supported in spaced relation to each other. In practice, these leaves usually include rectangular frames comprising pipes 8 which are slotted to receive and clamp the marginal portions of a body of open mesh steel or other heavy wire fabric 9. Over the frames are placed enveloping covers or bags of filter cloth 10 which the heavy wire mesh body 9 supports and prevents the opposite side sheets thereof from collapsing completely together.

The liquid mixture is forced into the barrel 1 under pressure through a perforated pipe 11 extending inside and along the bottom of the barrel, and the only outlet is through the upper pipes 8 of the filter frames which are attached to and extend through the head 2. Therefore, the liquid passes through the cloth of the filter leaves and through the interstices of the wire mesh body 9 and the intervals in the slot of the pipes between the portions of the wire clamped therein.

As the outlet is at the top and the inlet at the bottom of the barrel or tank 1, the heavy residue strained out of the liquor adheres first and more densely to the lower portions of the filter leaves and the barrel, and thence upward until, finally, the leaves are entirely covered with the deposit and, in fact, the entire barrel may become filled so as to form a core molded in conformity to the interior contour of the barrel.

In practice the barrel 1 is usually tapered or flared towards the end on which the removable head 2 is provided, so that the core thus formed therein will readily draw therefrom.

To afford a carriage for the filter leaves they are supported at their rear ends by having their upper and lower frame pipes 8 extended and resting in pockets 12 provided therefor on an annular frame 13 which is attached to parallel side beams 14 whose rear ends have rollers 15 to ride on trackways 16 mounted on brackets 17 at opposite sides of the barrel 1.

The head 2, to which the forward ends of the beams 14 are attached, has lateral bracket extensions (not shown) on which are rollers that ride on trackways 18. In practice, the head 2 also has endless cables attached thereto and carried about sheaves at the outer ends of the trackways 18 and rear end of the barrel, with their intermediate portions wrapped about driving drums operable in either direction by a motor, whereby the filter leaves are withdrawn and moved in with the head.

The foregoing description of the construction and operation of the filter apparatus is only general, as the details thereof, per se, form no part of the present invention other than in the arrangements and combinations set forth in the claims, and the invention is also applicable to other structures.

The present invention comprehends broadly the application of a mechanical contrivance either attached directly to or placed in cooperative relation to the barrel 1 so as to strip or otherwise remove the deposit from the filter leaves or elements as they are withdrawn from the barrel.

The device comprises, primarily and preferably, first, a cable which is supported at its ends in a vertical plane between a pair of the filter leaves or elements; second, a chain behind the cable; and, third, a stripper or scraper next following the chain. In practice, there will be one of these appliances placed between each adjacent pair of the filter leaves or elements throughout the width of the apparatus. In some cases, depending upon the nature of the material to be removed, the cable only will be employed, while in others the combination of the cable and chain may be used, or the cable and stripper or scraper, or the combination of all three.

Figure 2:
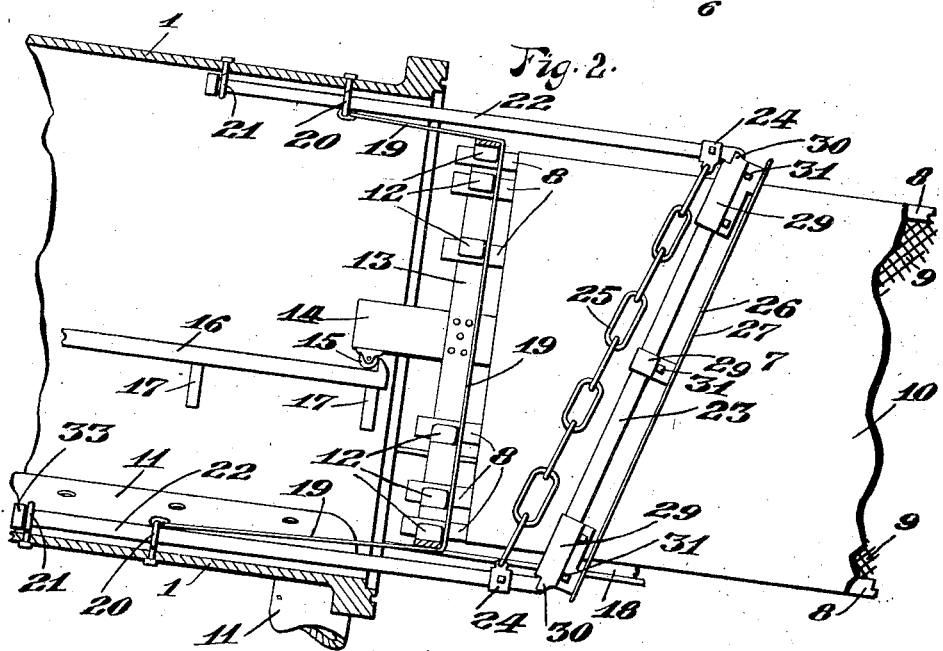
Figure 2 is a similar view with the head removed from the barrel and the deposit-removing appliance withdrawn to operative position.

As shown in Figures 1 and 2 of the drawings, the cable, indicated by the numeral 19, is fastened to eye-bolts 20 at the top and bottom of the tank 1 near the head 2, and with considerable slack. Slidable through the eye-bolts 20 and alined eye-bolts 21 are the legs 22 of a yoke or frame 23. Fastened to the legs 22 of the yoke, as at 24, is the chain 25 which is substantially taut or has but little slack. Preferably, this chain is composed of relatively large and open links and tapered from the bottom to the top. That is, the links are graduated, the largest or one of greatest width being at the lower end of the chain and each succeeding link being narrower. In Figure 4 is shown more clearly the preferred form of the chain wherein the links are all of the same character; while in Figure 5 is shown a modification thereof, wherein there are a series of long open links which are joined in close relation to each other by short and flat connecting links 25$^a$ which limit the torsional movement of the chain.

Mounted on the middle portion of the yoke 23 is a stripper or scraper 26 having oppositely disposed blades 27 whose outer edge portions are in a plane close to the faces of the adjacent filter leaves 7. These strippers are provided with elongated openings 28, leaving the stripping or scraping portions of the blades relatively narrow and affording sufficient dropping space between said portions and the middle portion of the yoke on which they are mounted.

The strippers 26 are preferably afforded a slight rocking movement on the yoke, and to this end they are provided with strap portions 29 which are looped loosely about the yoke, while at the ends are ears 30 which are spaced slightly from the yoke but are engageable with the same about the root portions of the legs 22, thereby constituting limiting stops to prevent the stripper from turning all the way around.

Different forms of the stripper are shown in detail in Figures 7, 8 and 9. In Figure 7 the wings of the stripper are inclined backward and the blade portion 27 has its outer margin curved slightly forward. This form is desirable for certain materials where a greater dropping space between the blades and yoke is necessary. In other cases the blades may be disposed transversely as shown in Figure 8, or in other words perpendicularly to the faces of the filter leaves; while in still further cases the blades may be set forward at an angle as shown in Figure 9. But in any case the blades are preferably back of the axis so as to drag well. In some cases, also, the strippers may be clamped tight on the yoke, and, as shown in Figures 8 and 9, the meeting portions of the supporting straps or clips 29 may be spaced apart and have alined apertures for the reception of the clamping bolts 31. By this means the stripper, in addition to being clamped on the yoke, may be adjusted to vary the distance between the scraping edges of the blades 27. That is, by manipulating the nut on the bolt the meeting portions of the straps 29 may be brought closer together or spread further apart, as the case may be, and accordingly the blades are moved in adjustment. This feature may also be applied in cases where it is desirable to have the strippers mounted swivelly, as it is obvious that it is only necessary to provide a suitable collar or bushing between the strap 29 and the yoke, upon which the strap may be clamped.

For certain materials where the stripper 26 may not be used to advantage, a helix 32 may be placed about the yoke as shown in Figure 10; and, preferably, will be made of spring metal and loose from the yoke except at its ends, and with its convolutions of considerable pitch to afford sufficient dropping space for the material loosened from the filter leaves. The diameter of the helix may be varied according to the nature of the material to be treated, and in some cases the helix may be tapered in the manner specified as to the chains 25. So, too, in some cases, a similar spring may be sleeved over a cable which may be substituted for the chain 25 shown in combination of the latter with the cable 19 and stripper 26 in Figures 1 and 2. Furthermore, it is also within the contemplation of the invention to eliminate the slidable yoke 23 entirely and in place thereof to use only the cable 19 or chain 25, either with or without the helical spring thereon, and fastened at their ends in any suitable manner direct to the tank 1 just inside the head 2, but with considerable slack so as to be drawn in a bow or loop outside the tank as the filter leaves with the deposit thereon are withdrawn from the tank.

When the taut chain or the strippers 26 or 32 are used it is preferable to set them at an inclination as shown in Figures 1 and 2; that is, outward from the bottom upward. This is to prevent crowding of the loosened material and permit it to drop readily through the openings of the chain or stripper.

The action of the contrivance will now be described. As the head 2 is withdrawn, bringing the filter leaves with it, the material deposited on the leaves engaging the stripping contrivances will cause the yoke 23 to move outward until arrested by collars 33 on the ends of the legs 22 coming in contact with the eye-bolts 21, or by other suitable stopping means, and the yoke being thus held from further outward movement, the continued outward movement of the leaves past the stripping contrivances causes the deposit to be thereby broken and stripped therefrom.

Should the deposit be of heavy consistency and completely fill the space between the leaves of the filter, the cable 19 will initially slice through the mass and cut a path for the chain 25 which will take off considerable of the material, while the blades 27 will remove the remainder. If the deposit on the filter leaves is more or less plastic the blades will shave it off the leaves; and the blades, of course, should be set relatively close to the leaves; while on the other hand, if the material is a granular and crumbly mass, the blades need not be set so close. And, as hereinbefore set forth, for some materials the blades 27 may be dispensed with; or, the helical spring arrangement shown in Figure 10 may be substituted therefor, particularly for certain frangible materials, because in addition to the stripping effect of the spring, its vibratory action is advantageous in jarring the material loose. The action is also similar in cases where the spring is used over a cable or chain. In such cases the resiliency of the spring may be brought more into play, as the cable or chain may be allowed more or less slack normally, so as to assume a bowed or looped form in action, and the spring sleeved thereon may be normally shorter than the cable or chain, so as to be stretched under tension as the latter is bowed in engagement with the material on the filter leaves as the latter are moving by. By this arrangement, as the material on the leaves gives way to the stripping or cutting action of the spring, the spring will instantly contract until it again meets with the resistance of the material remaining on the leaves, the effect being to vibrate and knock the engaging material loose and thereby leave a lesser quantity thereof to be stripped off the leaves.

While the engagement of the deposit on the leaves with the stripping or cutting elements will ordinarily be sufficient to draw the yoke 23 outward, releasable catches 34 may be provided on the head 2 to engage the middle portion of the yoke. As shown in Figures 1 and 6, these catches may comprise split spring clips having their bifurcated end portions 35 rounded or otherwise suitably formed to straddle the yoke and having a restricted mouth 36 with flared lips 37. In this way, the clips are made to engage the yoke as the head 2 is brought into closing relation to the barrel or tank 1, the lips 37 riding over the bar of the yoke to spread the legs of the clip so that the portions 35 may snap about the bar. Being thus engaged, the yoke will be drawn outward with the head 2 until it is arrested by the stop members 33 engaging the eye-bolts 21, whereupon the spring clips or catches 34 disengage from the yoke as the head continues on its outward movement.

It is to be understood that the invention comprehends broadly the provision of a deposit-removing or stripping device or appliance, either as a component part of or an attachment or appurtenance to the filter, acting to mechanically and automatically detach or strip the material from the leaves or elements of the filter as they are withdrawn from the barrel or tank, and is, therefore, not limited to the constructions and arrangements shown in the drawings.

What is claimed is:

1. In a filter of the character described, a pliable element supported at its ends in the planes of the top and bottom of the filter element and being normally loose and slack within the container, whereby to be drawn taut in a loop outside of the container by the engagement of the deposit on the filter element as the latter is withdrawn from the container.

2. In combination with a filter including a tank and vertically disposed, spaced, parallel filter leaves withdrawable endwise from said tank, and means for mechanically and automatically removing the deposit on said filter elements as the latter are withdrawn, the same including a cable secured at its ends in a vertical plane between a pair of adjacent filter elements and at points above and below the horizontal planes of the tops and bottoms, respectively, of said filter elements, and being normally slack, a chain behind said cable in the same vertical plane, and a stripper following said chain.

3. In a filter, a tank, vertically disposed filter elements in said tank in spaced, parallel relation to each other and being withdrawable therefrom conjointly in the same relation, deposit-removing means slidably mounted in said tank independently of said filter elements and being withdrawable partially to operating position outside the tank, and a releasable catch movable with said filter elements to automatically engage with said deposit-removing means in either direction to move the latter into and out of the tank to release automatically when said deposit-removing means reaches the limit of its outward travel, said deposit-removing means including elements located between the respective pairs of adjacent filter elements whereby to remove the deposit on the latter as they move outward.

4. In a filter, a tank, filter elements disposed vertically in said tank in spaced, parallel relation to each other, and being withdrawable endwise therefrom, and deposit-removing means including frames slidable in said tank and disposed medially between each pair of adjacent filter elements, said frames being withdrawable to a limited distance outside said tank, stripper elements on said frame in cooperative relation to the opposed faces of said filter elements, and a slicing cable between each pair of said filter elements operating initiatorily of said stripper elements upon the deposit on said filter elements whereby to detach said deposit as said filter elements are withdrawn from the tank.

5. In a filter of the character described, a series of slicing, breaking and scraping elements disposed medially between each pair of adjacent filter leaves, whereby to initially slice the mass deposited between the leaves and then detach the remainder of the mass by breaking and scraping the same as said leaves are moved past said deposit-removing elements.

6. In a filter of the character described and comprising vertically disposed filter elements in spaced, parallel relation, a combined mass-cutting, breaking and stripping element, located between each adjacent pair of said filter elements and including a helical spring wound loosely about a rod so as to be capable of limited transverse deflection, said rod being supported vertically and medially between the adjacent pair of filter elements and the convolutions of said spring acting circumferentially with respect to the faces of said filter elements whereby to detach the mass deposited on said elements during the withdrawal of said elements from the tank.

Signed at St. Louis, Missouri, this 5th day of May, 1919.

CHARLES L. McCARTY.